US012567931B2

(12) United States Patent
Jeon et al.

(10) Patent No.: US 12,567,931 B2
(45) Date of Patent: Mar. 3, 2026

(54) DEVICE AND METHOD FOR FRONTHAUL TRANSMISSION IN WIRELESS COMMUNICATION SYSTEM

(71) Applicant: SAMSUNG ELECTRONICS CO., LTD., Suwon-si (KR)

(72) Inventors: Namryul Jeon, Suwon-si (KR); Woohyun Kim, Suwon-si (KR); Jaeyoel Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 313 days.

(21) Appl. No.: 18/123,087

(22) Filed: Mar. 17, 2023

(65) Prior Publication Data

US 2023/0231686 A1     Jul. 20, 2023

Related U.S. Application Data

(63) Continuation of application No. PCT/KR2021/012876, filed on Sep. 17, 2021.

(30) Foreign Application Priority Data

Sep. 17, 2020     (KR) ........................ 10-2020-0120111

(51) Int. Cl.
*H04L 5/00* (2006.01)
*H04W 88/08* (2009.01)

(52) U.S. Cl.
CPC ......... *H04L 5/0051* (2013.01); *H04W 88/085* (2013.01)

(58) Field of Classification Search
CPC ........................ H04L 5/0051; H04W 88/085
See application file for complete search history.

(56) References Cited

U.S. PATENT DOCUMENTS

| | | | |
|---|---|---|---|
| 9,680,586 B2 | 6/2017 | Joung et al. | |
| 10,708,087 B2 | 7/2020 | Ye et al. | |
| 10,980,043 B2 | 4/2021 | He et al. | |
| 11,456,833 B2 | 9/2022 | Moon et al. | |
| 2018/0138957 A1 | 5/2018 | Wang et al. | |

(Continued)

FOREIGN PATENT DOCUMENTS

| | | |
|---|---|---|
| CN | 111567018 A | 8/2020 |
| KR | 10-2020-0005365 A | 1/2020 |

(Continued)

OTHER PUBLICATIONS

Communication dated Feb. 14, 2024, issued by the European Patent Office in European Application No. 21869808.2.

(Continued)

*Primary Examiner* — Derrick V Rose
(74) *Attorney, Agent, or Firm* — Sughrue Mion, PLLC

(57) ABSTRACT

A method of performed by a digital unit (DU) in a wireless communication system includes transmitting, to a radio unit (RU), a configuration message on a management plane, and receiving, from the RU, a plurality of user plane messages based on the configuration message, and the configuration message is used to configure a transmission order of the plurality of user plane messages, and the plurality of user plane messages correspond to a plurality of extended antenna-carriers (eAxCs).

16 Claims, 11 Drawing Sheets

(56) References Cited

U.S. PATENT DOCUMENTS

| | | | |
|---|---|---|---|
| 2019/0044754 A1 | 2/2019 | Hampel et al. | |
| 2019/0289497 A1* | 9/2019 | Rajagopal | H04B 7/0456 |
| 2019/0341970 A1 | 11/2019 | Lange | |
| 2020/0092229 A1 | 3/2020 | Levi et al. | |
| 2020/0260471 A1 | 8/2020 | Jeon et al. | |
| 2021/0126760 A1* | 4/2021 | Lee | H04B 7/0617 |
| 2024/0430892 A1* | 12/2024 | Amuru | H04W 28/02 |

FOREIGN PATENT DOCUMENTS

| | | |
|---|---|---|
| WO | 2019/183020 A1 | 9/2019 |
| WO | 2020/034552 A1 | 2/2020 |
| WO | 2020/110005 A1 | 6/2020 |
| WO | 2020/155362 A1 | 8/2020 |
| WO | 2020/166966 A1 | 8/2020 |

OTHER PUBLICATIONS

ECPRI Specification V1.1, "Common Public Radio Interface: eCPRI Interface Specification," total 62 pages, Jan. 10, 2018, XP055612009.

"O-RAN Alliance Working Group 4", 2020, O-RAN.WG4.MP.0-v04.00, O-RAN Alliance e.V., 183 pages total.

Written Opinion (PCT/ISA/237) issued Jan. 14, 2022 by the International Searching Authority for International Patent Application No. PCT/KR2021/012876.

International Search Report (PCT/ISA/210) issued Jan. 14, 2022 by the International Searching Authority for International Patent Application No. PCT/KR2021/012876.

Communication dated Oct. 24, 2025, issued by the China National Intellectual Property Administration in Chinese Application No. 202180063770.9.

\* cited by examiner

DEVICE AND METHOD FOR FRONTHAUL TRANSMISSION IN WIRELESS COMMUNICATION SYSTEM

CROSS-REFERENCE TO RELATED APPLICATION

This application is a bypass continuation application of International Application No. PCT/KR2021/012876, filed on Sep. 17, 2021, which is based on and claims priority to Korean Patent Application No. 10-2020-0120111, filed on Sep. 17, 2020, in the Korean Intellectual Property Office, the disclosures of which are incorporated by reference herein in their entireties.

BACKGROUND

1. Field

The present disclosure relates generally to a wireless communication system, and more specifically, to a device and method for fronthaul transmission in a wireless communication system.

2. Description of Related Art

An improved $5^{th}$ generation (5G) communication system or a pre-5G communication system is being developed to meet the growing demand for wireless data traffic after the commercialization of a $4^{th}$ generation (4G) communication system. For this reason, the 5G communication system or pre-5G communication system is called a Beyond 4G Network communication system or a Post LTE system.

In order to achieve a high data rate, the 5G communication system is being considered for implementation in a mmWave band (e.g., a 60 Giga Hertz (GHz) band). In order to mitigate a path loss of radio waves and increase a propagation distance of radio waves in an ultra-high frequency band, beamforming, massive multiple input multiple output (MIMO), full dimensional multiple input multiple output (FD-MIMO), array antenna, analog beamforming, and large scale antenna technologies are being considered in the 5G communication system.

Also, to improve a system network, in the 5G communication system, an evolved small cell, an advanced small cell, a cloud radio access network (cloud RAN), an ultra-dense network, device to device communication (D2D), wireless backhaul, moving network, cooperative communication, coordinated multi-points (CoMP), and reception interference cancellation, etc. are being developed.

In addition, in the 5G communication system, advanced coding modulation (ACM) methods such as hybrid frequency shift keying and quadrature amplitude modulation (FQAM) and sliding window superposition coding (SWSC), and advanced access technologies such as filter bank multi carrier (FBMC), non-orthogonal multiple access (NOMA), and sparse code multiple access (SCMA), etc. are being developed.

As a transmission capacity increases in a wireless communication system, function split that functionally separates base stations is applied. In accordance with the function split, the base station can be split into a digital unit (DU) and a radio unit (RU), and fronthaul for communication between the DU and the RU is defined, and transmission through the fronthaul is required.

SUMMARY

Provided are a device and method for controlling the transmission of a sounding reference signal (SRS) on a fronthaul interface.

Also, provide are a device and method for reducing a memory burden of a DU caused by the storing of an SRS, when operating a digital unit (DU) and a radio unit (RU) in a wireless communication system.

Also, provided are a device and method for using an uplink buffer, when transmitting an SRS on a fronthaul interface, while operating a digital unit (DU) and a radio unit (RU) in a wireless communication system.

According to an aspect of the disclosure, a method of operating a digital unit (DU) in a wireless communication system includes transmitting a configuration message to a radio unit (RU) on a management plane, and receiving, from the RU, a plurality of user plane messages based on the configuration message, and the configuration message includes information for configuring a transmission order of the plurality of user plane messages, and the plurality of user plane messages correspond to a plurality of extended antenna-carriers (eAxCs).

The plurality of eAxCs may correspond to a plurality of antennas of the RU.

Information on a group order in the management plane and information on a transmission order of eAxCs in a group may be configured in the RU.

The configuration message may be associated with information indicating whether the configuration of the transmission order is supported by the RU.

The method may further include receiving capability information from the RU, the capability information indicating a sounding reference signal (SRS) scheme supported by the RU, and determining the configuration message based on the received capability information.

The transmission order may be an ascending order of antenna numbers of antennas of the RU.

According to an aspect of the disclosure, a method of operating a radio unit (RU) in a wireless communication system includes receiving a configuration message from a digital unit (DU) on a management plane, configuring a transmission order of a plurality of user plane messages based on the configuration message, and transmitting the plurality of user plane messages to the DU in the transmission order, and the configuration message includes information for configuring the transmission order of the plurality of user plane messages, and the plurality of user plane messages correspond to a plurality of extended antenna-carriers (eAxCs).

The plurality of eAxCs may correspond to a plurality of antennas of the RU.

Information on a group order in the management plane and information on a transmission order of eAxCs in a group may be configured in the RU.

The configuration message may be associated with information indicating whether configuration of the transmission order is supported by the RU.

The method may further include transmitting capability information to the DU, and the capability information may indicate a sounding reference signal (SRS) scheme supported by the RU, and the configuration message may be determined based on the capability information.

According to an aspect of the disclosure, a digital unit (DU) in a wireless communication system includes at least one transceiver, a memory storing at least one instruction, and at least one processor configured to execute the at least one instruction to: transmit, through the at least one processor, a configuration message to a radio unit (RU) on a management plane, and receive, from the RU through the at least one transceiver, a plurality of user plane messages based on the configuration message, and the configuration message includes information for configuring a transmission order of the plurality of user plane messages, and the plurality of user plane messages correspond to a plurality of extended antenna-carriers (eAxCs).

The plurality of eAxCs may correspond to a plurality of antennas of the RU.

Information on a group order in the management plane and information on a transmission order of eAxCs in a group may be configured in the RU.

The configuration message may be associated with information indicating whether the configuration of the transmission order is supported by the RU.

The at least one processor may be further configured to execute the instruction to: receive, from the RU through the at least one transceiver, capability information from the RU, the capability information indicating a sounding reference signal (SRS) scheme supported by the RU, and determine the configuration messaged based on the received capability information.

According to an aspect of the disclosure, a radio unit (RU) in a wireless communication system includes at least one transceiver, a memory storing at least one instruction and at least one processors configured to execute the at least one instruction to: receive, through the at least one transceiver, a configuration message from a digital unit (DU) on a management plane, and configure a transmission order of a plurality of user plane messages based on the configuration message, and transmit, to the DU through the at least one transceiver, the plurality of user plane messages in the transmission order, and the configuration message includes information for configuring the transmission order of the plurality of user plane messages, and the plurality of user plane messages correspond to a plurality of extended antenna-carriers (eAxCs).

The plurality of eAxCs may correspond to a plurality of antennas of the RU.

Information on a group order in the management plane and information on a transmission order of eAxCs in a group may be configured in the RU.

The at least one processor may be further configured to execute the at least one instruction to transmit, through the at least one transceiver, capability information to the DU, and the capability information indicates a sounding reference signal (SRS) scheme supported by the RU, and the configuration message is determined based on the capability information.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
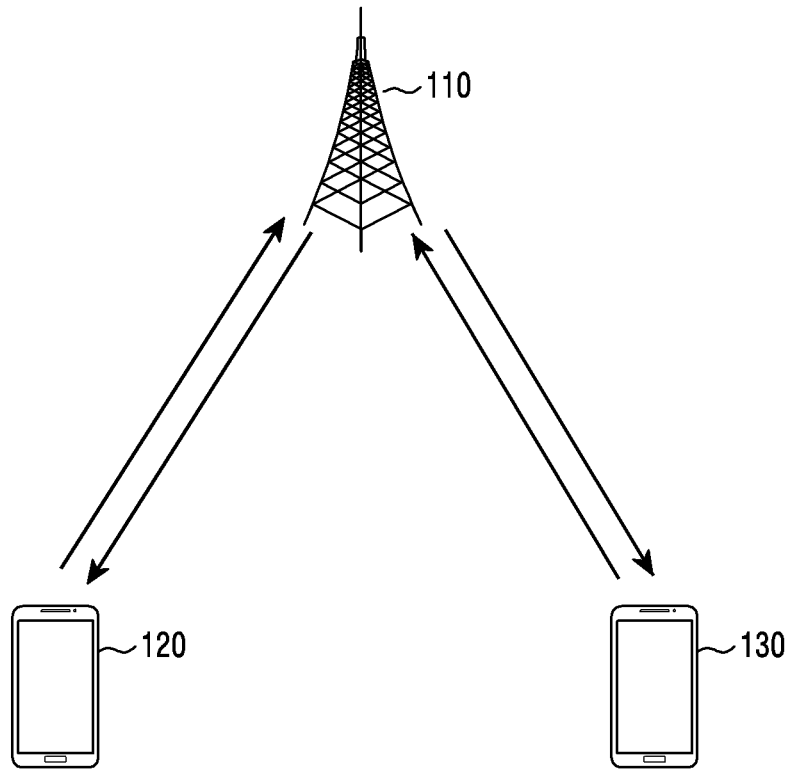
FIG. 1A illustrates a wireless communication system according to various embodiments of the present disclosure.

Terms used in the present disclosure are only used to describe a specific embodiment, and may not be intended to limit the scope of other embodiments. Singular expressions may include plural expressions unless the context clearly dictates otherwise. Terms used herein, including technical or scientific terms, may have the same meaning as those commonly understood by a person having an ordinary skill in the art described in the present disclosure. Among the terms used in the present disclosure, terms defined in general dictionaries may be interpreted as having the same or similar meanings as those in the context of the related art, and unless explicitly defined in the present disclosure, are not be interpreted as ideal or excessively formal meanings. In some cases, even terms defined in the present disclosure may not be interpreted to exclude embodiments of the present disclosure.

In various embodiments of the present disclosure described below, a hardware access method is described as an example. However, since various embodiments of the present disclosure include a technology using both hardware and software, the various embodiments of the present disclosure do not exclude a software-based access method.

Terms referring to signals (e.g., message, information, preamble, signal, signaling, sequence, and stream) used in the following description, terms referring to resources (e.g., symbols, slot, subframe, radio frame, subcarrier, resource element (RE), resource block (RB), bandwidth part (BWP), and occasion), terms for operation state (e.g., step, operation, and procedure), terms referring to data (e.g., packet, user stream, information, bit, symbol, and codeword), terms referring to channel, terms referring to control information (e.g., downlink control information (DCI), medium access control element (MAC CE), and radio resource control (RRC) signaling), terms referring to network entities, terms referring to components of a device, and the like are illustrated for convenience of description. Accordingly, the present disclosure is not limited to the terms described below, and other terms having equivalent technical meanings may be used.

Also, in the present disclosure, an expression of more than or less than may be used to determine whether a specific condition is satisfied or fulfilled, but this is only a description for expressing an example, and does not to exclude a description of equal to or more than, or equal to or less than. A condition described as 'equal to or more than' may be replaced with 'more than', and a condition described as 'equal to or less than' may be replaced with 'less than', and a condition described as 'equal to or more than, and less than' may be replaced with 'more than, and equal to or less than'.

Also, the present disclosure describes various embodiments by using terms used in some communication standards (e.g., 3rd generation partnership project (3GPP), extensible radio access network (xRAN), and open-radio access network (O-RAN)), but this is only an example for explanation. Various embodiments of the present disclosure may be easily modified and applied to other communication systems.

FIG. 1A illustrates a wireless communication system according to various embodiments of the present disclosure. FIG. 1A illustrates a base station 110, a terminal 120, and a terminal 130 as some of nodes using a wireless channel in the wireless communication system. Although FIG. 1A shows only one base station, other base stations identical or similar to the base station 110 may be further included.

The base station 110 is a network infrastructure that provides wireless access to the terminals 120 and 130. The base station 110 has coverage that is defined as a certain geographical area, based on a distance over which signals may be transmitted. The base station 110 may be referred to as, in addition to base station, 'access point (AP)', 'eNodeB (eNB)', '5th generation node (5G node)', 'next generation nodeB (gNB)', 'wireless point', 'transmission/reception point (TRP)', or other terms having an equivalent technical meaning.

Each of the terminal 120 and the terminal 130 is a device used by a user and communicates with the base station 110 through a wireless channel. A link from the base station 110 to the terminal 120 or terminal 130 is referred to as downlink (DL), and a link from the terminal 120 or terminal 130 to the base station 110 is referred to as uplink (UL). Also, the terminal 120 and the terminal 130 may perform communication with each other through the wireless channel. In this case, a device-to-device link (D2D) between the terminal 120 and the terminal 130 is referred to as a sidelink, and the sidelink may be used interchangeably with a PC5 interface. In some cases, at least one of the terminal 120 and terminal 130 may be operated without user's intervention. That is, at least one of the terminal 120 and the terminal 130 is a device that performs machine type communication (MTC), and may not be carried by the user. Each of the terminal 120 and the terminal 130 may be referred to as, in addition to terminal, 'user equipment (UE)', 'customer premises equipment (CPE)', 'mobile station', 'subscriber station', 'remote terminal', 'wireless terminal', 'electronic device', or 'user device' or other terms having an equivalent technical meaning.

The base station 110, the terminal 120, and the terminal 130 may perform beamforming. The base station and the terminal may transmit and receive radio signals in a relatively low frequency band (e.g., frequency range 1 (FR1) of NR). Also, the base station and the terminal may transmit and receive radio signals in a relatively high frequency band (e.g., FR2 of NR, and mmWave band (e.g., 28 GHz, 30 GHz, 38 GHz, and 60 GHz)). In some embodiments, the base station 110 may perform communication with the terminal 120 within a frequency range corresponding to FR1. In some embodiments, the base station 110 may perform communication with the terminal 130 within a frequency range corresponding to FR2. At this time, in order to improve a channel gain, the base station 110, the terminal 120, and the terminal 130 may perform beamforming. Here, the beamforming may include transmit beamforming and receive beamforming. That is, the base station 110, the terminal 120, and the terminal 130 may give directivity to a transmitted signal or a received signal. To this end, the base station 110 and the terminals 120 and 130 may select serving beams through a beam search or beam management procedure. After the serving beams are selected, communication may be performed through a resource having a QCL relationship with a resource having transmitted the serving beams.

When the large-scale characteristics of a channel carrying a symbol on a first antenna port may be inferred from a channel carrying a symbol on a second antenna port, the first antenna port and the second antenna port may be evaluated to be in a QCL relationship. For example, the large-scale characteristics may include at least one of delay spread, Doppler spread, Doppler shift, average gain, average delay, and spatial receiver parameter.

In FIG. 1A, it is shown that all of the base station and the terminals perform beamforming, but various embodiments of the present disclosure are not necessarily limited thereto. In some embodiments, the terminals may or may not perform the beamforming. Also, the base station may or may not perform the beamforming. That is, only one of the base station and the terminals may perform the beamforming, or all of the base station and the terminals may not perform the beamforming.

In the present disclosure, a beam refers to a spatial flow of a signal in a wireless channel, and is formed by one or more antennas (or antenna elements), and this forming process may be referred to as beamforming. The beamforming may include analog beamforming and digital beamforming (e.g., precoding). A reference signal transmitted based on the beamforming may include, for example, a demodulation-reference signal (DM-RS), a channel state information-reference signal (CSI-RS), a synchronization signal/physical broadcast channel (SS/PBCH), and a sounding reference signal (SRS). Also, as a configuration for each reference signal, an IE may be used such as a CSI-RS resource or an SRS-resource, etc., and this configuration may include information associated with a beam. The information associated with the beam may refer to whether a corresponding configuration (e.g., CSI-RS resource) uses the same spatial domain filter as another configuration (e.g., another CSI-RS resource within the same CSI-RS resource set), or whether it uses a different spatial domain filter, or which reference signal is quasi-co-located (QCL), or when it is QCL, what type (e.g., QCL type A, B, C, or D) is.

In the relate art, in a communication system in which a cell radius of a base station is relatively large, each base station was installed to include functions of a digital processing unit (or a digital unit (DU)) and a radio frequency (RF) processing unit (or a radio unit (RU)). However, as a high frequency band is used in $4^{th}$ generation (4G) and/or beyond communication systems, and the cell radius of the base station decreases, the number of base stations to cover a specific area has increased, and the installation cost burden of operators to install the increased base stations has increased. To minimize the installation cost of the base station, a structure has been proposed in which the DU and RU of the base station are separated, and one or more RUs are connected to one DU through a wired network, and one or more geographically distributed RUs are deployed to cover a specific area. Hereinafter, an arrangement structure, and extension examples, of the base station of various embodiments of the present disclosure are described with reference to FIG. 1B.

Figure 1B:
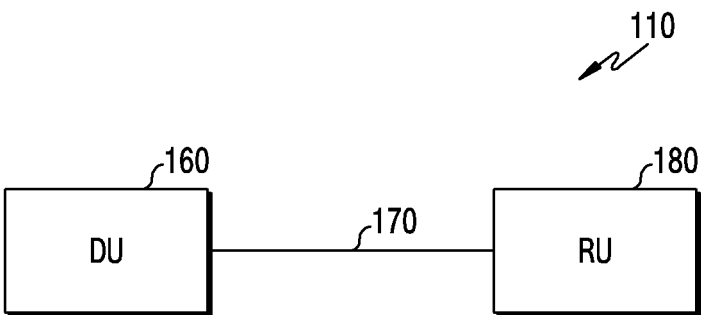
FIG. 1B illustrates an example of a fronthaul structure based on functional split of a base station according to various embodiments of the present disclosure.

FIG. 1B illustrates an example of a fronthaul structure based on functional split of a base station according to various embodiments of the present disclosure. Unlike backhaul between a base station and a core network, fronthaul refers to a connection of entities between a wireless LAN and the base station.

Referring to FIG. 1B, the base station 110 may include a DU 160 and an RU 180. Fronthaul 170 between the DU 160 and the RU 180 may be operated through an $F_x$ interface. For operation of the fronthaul 170, an interface such as an enhanced common public radio interface (eCPRI) and a radio over Ethernet (ROE) may be used.

As a communication technology develops, mobile data traffic increases, and accordingly, a bandwidth requirement for fronthaul between a digital unit and a radio unit has greatly increased. In arrangement such as a centralized/cloud radio access network (C-RAN), the DU may be implemented to perform functions for a packet data convergence protocol (PDCP), a radio link control (RLC), a media access control (MAC), and physical (PHY), and the RU may be implemented to perform more functions for a PHY layer in addition to a radio frequency (RF) function.

The DU 160 may be in charge of upper layer functions of a wireless network. For example, the DU 160 may perform a function of a MAC layer and a part of a PHY layer. Here, the part of the PHY layer is performed at a higher level among the functions of the PHY layer, and may include, for example, channel encoding (or channel decoding), scrambling (or descrambling), modulation (or demodulation), and layer mapping (or layer demapping). According to an embodiment, when the DU 160 complies with the O-RAN standard, it may be referred to as an O-DU (O-RAN DU). The DU 160 may be replaced with, and expressed as, a first network entity for the base station (e.g., gNB) according to need, in embodiments of the present disclosure.

The RU 180 may be in charge of lower layer functions of the wireless network. For example, the RU 180 may perform a part of a PHY layer, and an RF function. Here, the part of the PHY layer is performed at a relatively lower level than the DU 160 among the functions of the PHY layer, and may include, for example, IFFT transform (or FFT transform), CP insertion (CP removal), and digital beamforming. An example of this specific function split is described in detail in FIG. 4. The RU 180 may be referred to as 'access unit (AU)', 'access point (AP)', 'transmission/reception point (TRP)', 'remote radio head (RRH)', 'radio unit (RU)' or other terms having an equivalent technical meaning. According to an embodiment, when the RU 180 complies with the O-RAN standard, it may be referred to as an O-RU (O-RAN RU). The RU 180 may be replaced with, and expressed as, a second network entity for the base station (e.g., gNB) according to need, in embodiments of the present disclosure.

Although FIG. 1B illustrates that the base station includes the DU and the RU, various embodiments of the present disclosure are not limited thereto. In some embodiments, the base station may be implemented as a distributed deployment of a centralized unit (CU) configured to perform functions of upper layers (e.g., packet data convergence protocol (PDCP) and RRC) of an access network and a distributed unit (DU) configured to perform functions of lower layers. In this case, the distributed unit (DU) may include the digital unit (DU) and the radio unit (RU) of FIG. 1B. Between a core (e.g., 5G core (5GC) or next generation core (NGC)) network and a wireless network (RAN), the base station may be implemented in a structure in which the CU, the DU, and the RU are arranged in order. An interface between the CU and the distributed unit (DU) may be referred to as an F1 interface.

The centralized unit (CU) may be connected to one or more DUs, and be in charge of functions of upper layers than the DU. For example, the CU may be in charge of functions of radio resource control (RRC) and packet data convergence protocol (PDCP) layers, and the DU and RU may be in charge of functions of lower layers. The DU may perform some functions (high PHY) of radio link control (RLC), media access control (MAC), and physical (PHY) layers, and the RU may perform other functions (low PHY) of the PHY layer. Also, as an example, the digital unit (DU) may be included in the distributed unit (DU) according to a distributed deployment implementation of the base station. Hereinafter, unless otherwise defined, operations of the digital unit (DU) and the RU will be described, but various embodiments of the present disclosure may be applied to all of a base station deployment including the CU or a deployment in which the DU is directly connected to a core network without the CU (i.e., the CU and the DU are integrated into one entity and implemented).

Figure 2:
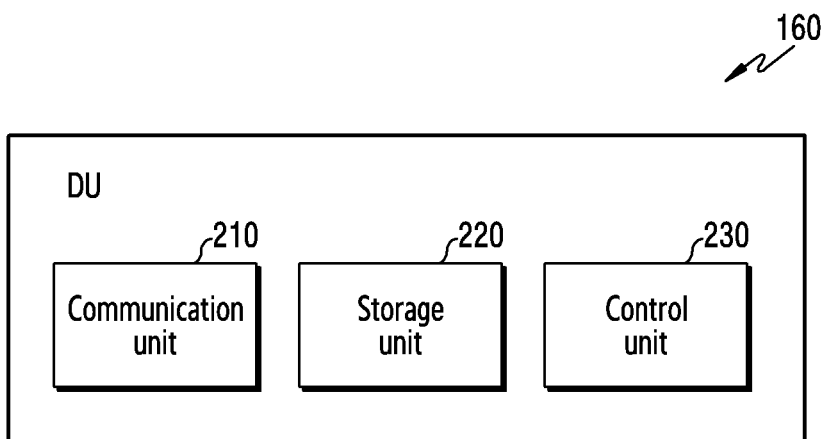
FIG. 2 illustrates a construction of a digital unit (DU) according to various embodiments of the present disclosure.

FIG. 2 illustrates a construction of a digital unit (DU) in a wireless communication system according to various embodiments of the present disclosure. The construction illustrated in FIG. 2 may be understood as a construction of the DU 160 of FIG. 1B as a part of the base station. Terms such as '. . . unit', '. . . part', etc. used below refer to a unit that processes at least one function or operation, and this may be implemented by hardware or software, or a combination of hardware and software.

Referring to FIG. 2, the DU 160 includes a communication unit 210, a storage unit 220, and a control unit 230.

The communication unit 210 may perform functions for transmitting and receiving signals in a wired communication environment. The communication unit 210 may include a wired interface for controlling a direct connection between devices through a transmission medium (e.g., a copper wire or an optical fiber). For example, the communication unit 210 may transmit an electrical signal to another device through a copper wire, or perform conversion between an electrical signal and an optical signal. The communication unit 210 may be connected to a radio unit (RU). The communication unit 210 may be connected to a core network or be connected to a CU of distributed deployment.

The communication unit 210 may perform functions for transmitting and receiving signals in the wireless communication environment. For example, the communication unit 210 may perform a conversion function between a baseband signal and a bit stream according to the physical layer standard of the system. For example, when data is transmitted, the communication unit 210 provides complex symbols by encoding and modulating a transmission bit stream. Also, when data is received, the communication unit 210 restores a received bit stream by demodulating and decoding a baseband signal. Also, the communication unit 210 may include a plurality of transmit/receive paths. Also, according to an embodiment, the communication unit 210 may be connected to a core network or be connected to other nodes (e.g., integrated access backhaul (IAB)).

The communication unit 210 may transmit and receive signals. To this end, the communication unit 210 may include at least one transceiver. For example, the communication unit 210 may transmit a synchronization signal, a reference signal, system information, a message, a control message, a stream, control information, or data, etc. Also, the communication unit 210 may perform beamforming.

The communication unit 210 transmits and receives signals as described above. Accordingly, all or part of the communication unit 210 may be referred to as 'transmitting unit', 'receiving unit' or 'transceiving unit'. Also, in the following description, transmission and reception performed through a wireless channel are used to mean that the above-described processing is performed by the communication unit 210.

The communication unit 210 may further include a backhaul communication unit for connecting to a core network or another base station. The backhaul communication unit provides an interface for communicating with other nodes in the network. That is, the backhaul communication unit converts a bit stream transmitted from a base station to another node, for example, another access node, another base station, an upper node, a core network, etc., into a physical signal, and converts a physical signal received from another node into a bit stream.

The storage unit 220 stores data such as a basic program for operation of the DU 160, an application program, configuration information, and the like. The storage unit 220 may include a memory. The storage unit 220 may include a volatile memory, a non-volatile memory, or a combination of volatile and non-volatile memories. And, the storage unit 220 provides the stored data according to a request of the control unit 230. According to various embodiments, the storage unit 220 may include a buffer for storing an SRS. In some embodiments, the storage unit 220 may include a buffer exclusively used for an SRS (hereinafter, an SRS buffer). Also, in some embodiments, the storage unit 220 may include a buffer for a physical uplink shared channel (PUSCH) or a physical uplink control channel (PUCCH) (hereinafter, a PUxCH buffer).

The control unit 230 controls overall operations of the DU 160. For example, the control unit 230 transmits and receives signals through the communication unit 210 (or through the backhaul communication unit). Also, the control unit 230 writes data in the storage unit 220, and reads the data from the storage unit 220. And, the control unit 230 may perform functions of a protocol stack required by the communication standards. To this end, the control unit 230 may include at least one processor.

According to various embodiments, the control unit 230 may include an SRS processing unit. The control unit 230 may use a buffer for SRS processing. The control unit 230 may acquire SRS packet data acquired from the RU 180. In some embodiments, the control unit 230 may acquire SRS data from the SRS buffer. Also, in some embodiments, the control unit 230 may acquire SRS data from a PUxCH buffer. The SRS processing unit is a command set or code stored in the storage unit 320, and may be a command/code at least temporarily residing in the control unit 230 or a storage space storing the commands/code, or be a part of a circuit constituting the control unit 230. According to various embodiments, the control unit 230 may control the DU 160 to perform operations of various embodiments described later.

The construction of the DU 160 illustrated in FIG. 2 is only an example, and an example of a DU performing various embodiments of the present disclosure is not limited to the construction illustrated in FIG. 2. According to various embodiments, some constructions may be added, deleted, or changed.

Figure 3:
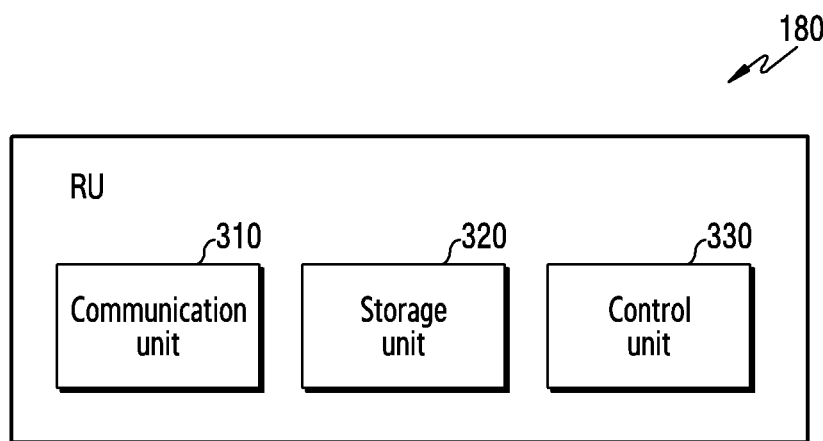
FIG. 3 illustrates a construction of a radio unit (RU) according to various embodiments of the present disclosure.

FIG. 3 illustrates a construction of a radio unit (RU) in a wireless communication system according to various embodiments of the present disclosure. The construction illustrated in FIG. 3 may be understood as a construction of the RU 180 of FIG. 1B as a part of the base station. Terms such as ' . . . unit', ' . . . part', etc. used below refer to a unit that processes at least one function or operation, and this may be implemented by hardware or software, or a combination of hardware and software.

Referring to FIG. 3, the RU 180 includes a communication unit 310, a storage unit 320, and a control unit 330.

The communication unit 310 performs functions for transmitting and receiving signals through a wireless channel. For example, the communication unit 310 up-converts a baseband signal into an RF band signal and transmits the signal through an antenna, and down-converts an RF band signal received through the antenna into a baseband signal. For example, the communication unit 310 may include a transmission filter, a reception filter, an amplifier, a mixer, an oscillator, a digital to analog converter (DAC), an analog to digital converter (ADC), and the like.

Also, the communication unit 310 may include a plurality of transmit/receive paths. Further, the communication unit 310 may include an antenna unit. The communication unit 310 may include at least one antenna array composed of a plurality of antenna elements. In terms of hardware, the communication unit 310 may include a digital circuit and an analog circuit (e.g., a radio frequency integrated circuit (RFIC)). Here, the digital circuit and the analog circuit may be implemented in one package. Also, the communication unit 310 may include a plurality of RF chains. The communication unit 310 may perform beamforming. The communication unit 310 may apply a beamforming weight to a signal to be transmitted and received in order to give the signal a directivity according the setting of the control unit 330. According to an embodiment, the communication unit 310 may include a radio frequency (RF) block (or RF unit).

Also, the communication unit 310 may transmit and receive signals. To this end, the communication unit 310 may include at least one transceiver. The communication unit 310 may transmit a downlink signal. The downlink signal may include a synchronization signal (SS), a reference signal (RS) (e.g., cell-specific reference signal (CRS) and demodulation (DM)-RS), system information (e.g., MIB, SIB, remaining system information (RMSI), and other system information (OSI)), a configuration message, control information, or downlink data, etc. Also, the communication unit 310 may receive an uplink signal. The uplink signal may include a random access related signal (e.g., random access preamble (RAP) (or message 1 (Msg1)), and message 3 (Msg3)), a reference signal (e.g., sounding reference signal (SRS) and DM-RS), or a power headroom report (PHR), etc.

The communication unit 310 transmits and receives signals as described above. Accordingly, all or part of the communication unit 310 may be referred to as 'transmitting unit', 'receiving unit' or 'transceiving unit'. Also, in the following description, transmission and reception performed through a wireless channel are used to mean that the above-described processing is performed by the communication unit 310.

The storage unit 320 stores data such as a basic program for operation of the RU 180, an application program, configuration information, and the like. The storage unit 320 may include a volatile memory, a non-volatile memory, or a combination of volatile and non-volatile memories. And, the storage unit 320 provides the stored data according to a request of the control unit 330. According to an embodiment, the storage unit 320 may include a memory for a condition, command, or configuration value related to an SRS transmission scheme.

The control unit 330 controls overall operations of the RU 180. For example, the control unit 330 transmits and receives signals through the communication unit 310. Also, the control unit 330 writes data in the storage unit 320, and reads the data from the storage unit 320. Also, the control unit 330 may perform functions of a protocol stack required by communication standards. To this end, the control unit 330 may include at least one processor. In some embodiments, the control unit 330 may be configured to transmit an SRS to the DU 160, based on an antenna number. Also, in some embodiments, the control unit 330 may be configured to transmit the SRS to the DU 160 after uplink transmission. The condition, command or configuration value of the SRS transmission scheme is a command set or code stored in the storage unit 320, and may be a command/code at least temporarily residing in the control unit 330 or a storage space storing the command/code, or be a part of a circuit constituting the control unit 330. Also, the control unit 330 may include various modules for performing communication. According to various embodiments, the control unit 330 may control the RU 180 to perform operations of various embodiments described later.

Figure 4:
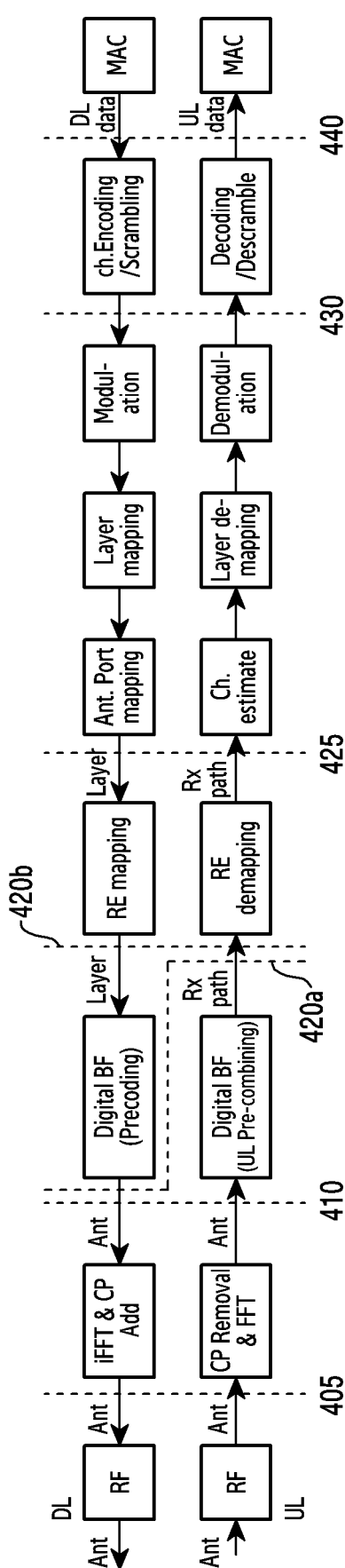
FIG. 4 illustrates an example of function split according to various embodiments of the present disclosure.

FIG. 4 illustrates an example of function split in a wireless communication system according to various embodiments of the present disclosure. As a wireless communication technology advances (e.g., the introduction of a 5$^{th}$ generation (5G) communication system (or new radio (NR) communication system)), a frequency band used has further increased, and as a cell radius of a base station has become very small, the number of RUs required to be installed has more increased. Also, in the 5G communication system, an amount of transmitted data has increased by more than 10 times, and a transmission capacity of a wired network transmitted through fronthaul has greatly increased. For these reasons, the installation cost of the wired network may increase significantly. Therefore, in order to lower the transmission capacity of the wired network and reduce the installation cost of the wired network, techniques for lowering the transmission capacity of the wired network transmitted through the fronthaul by transferring some functions of a modem of a DU to the RU have been proposed, and these techniques may be referred to as 'function split'.

In order to reduce the burden of the DU, a way of extending a role of the RU being in charge of only an RF function to some functions of a physical layer is considered. In this case, as the RU performs functions of an upper layer, a throughput of the RU increases and thus a transmission bandwidth in fronthaul increases and at the same time, delay time requirement constraints caused by response processing may be lowered. On the other hand, as the RU performs the functions of the upper layer, a virtualization gain decreases, and a size/weight/cost of the RU increases. Considering the trade-off of the advantages and disadvantages described above, it is required to implement optimal function split.

Referring to FIG. 4, function splits in a physical layer below a MAC layer are shown. In downlink (DL) transmitting a signal to a terminal through a wireless network, a base station may sequentially perform channel encoding/scrambling, modulation, layer mapping, antenna mapping, RE mapping, digital beamforming (e.g., precoding), IFFT transform/CP add, and RF conversion. In uplink (UL) receiving a signal from the terminal through the wireless network, the base station may sequentially perform RF conversion, FFT transform/CP removal, digital beamforming (pre-combining), RE demapping, channel estimation, layer demapping, demodulation, and decoding/descrambling. Split of uplink functions and downlink functions may be defined in various types by a need between vendors, discussions on standards, and the like according to the above-described trade-off.

A first function split 405 may be a split of an RF function and a PHY function. The first function split is that the PHY function in the RU is not substantially implemented, and may be referred to as Option 8, for example. A second function split 410 allows the RU to perform IFFT transform/CP add in DL of the PHY function and FFT transform/CP removal in UL, and allows the DU to perform the remaining PHY functions. For example, the second function split 410 may be referred to as Option 7-1. A third function split 420a allows the RU to perform IFFT transform/CP insertion in DL of the PHY function and perform FFT transform/CP removal and digital beamforming in UL, and allows the DU to perform the remaining PHY functions. For example, the third function split 420a may be referred to as Option 7-2x Category A. A fourth function split 420b allows the RU to perform up to digital beamforming in all of DL and UL, and allows the DU to perform upper PHY functions after digital beamforming. For example, the fourth function split 420b may be referred to as Option 7-2x Category B. A fifth function split 425 allows the RU to perform RE mapping (or RE demapping) in all of DL and UL, and allows the DU to perform upper PHY functions after RE mapping (or RE demapping). For example, the fifth function split 425 may be referred to as Option 7-2. A sixth function split 430 allows the RU to perform up to modulation (or demodulation) in all of DL and UL, and allows the DU to perform subsequent upper PHY functions up to modulation (or demodulation). For example, the sixth function split 430 may be referred to as Option 7-3. A seventh function split 440 allows the RU to perform encoding/scrambling (or decoding/descrambling) in all of DL and UL, and allows the DU to perform subsequent upper PHY functions up to modulation (or demodulation). For example, the seventh function split 440 may be referred to as Option 6.

According to an embodiment, when large-capacity signal processing such as FR1 MMU is expected, function split in a relatively high layer (e.g., the fourth function split 420b) may be required to reduce fronthaul capacity. Also, because a control interface becomes complex and a large number of PHY processing blocks are included in the RU, function split in a too high layer (e.g., the sixth function split 430) may cause a burden on the implementation of the RU, so appropriate function split may be required according to a deployment and implementation scheme of the DU and the RU.

According to an embodiment, when the RU cannot process the precoding of data received from the DU (i.e., when there is a limit to a precoding capability of the RU), the third function split 420a or lower function split (e.g., the second function split 410) may be applied. Inversely, when the RU has an ability to process the precoding of data received from the DU, the fourth function split 420b or higher function split (e.g., the sixth function split 430) may be applied. Hereinafter, in the present disclosure, various embodiments are described based on the third function split 420a (category A) or the fourth function split 420b (category B) for performing the beamforming process in the RU unless limited otherwise, but do not exclude a construction of an embodiment through other function splits. The functional construction, signaling, or operation of FIG. 5 to FIG. 10 described later may be applied not only to the third function split 420*a* or the fourth function split 420*b* but also to other function splits.

In various embodiments of the present disclosure, the standards of eCPRI and O-RAN as a fronthaul interface at message transmission between a DU (e.g., the DU 160 of FIG. 1B) and an RU (e.g., the RU 180 of FIG. 1B) are exemplarily described. An eCPRI header, an O-RAN header, and additional fields may be included in an Ethernet payload of a message. Hereinafter, various embodiments of the present disclosure are described using standard terms of eCPRI or O-RAN, but other expressions having equivalent meanings may be substituted and used in various embodiments of the present disclosure.

As a transport protocol of fronthaul, Ethernet and eCPRI, which are easy to share with a network, may be used. The eCPRI header and the O-RAN header may be included in the Ethernet payload. The eCPRI header may be positioned in front of the Ethernet payload. The contents of the eCPRI header are given as follows.

ecpriVersion (4 bits): 0001b (fixed value)
  ecpriReserved (3 bits): 0000b (fixed value)
  ecpriConcatenation (1 bit): 0b (fixed value)
  ecpriMessage (1 byte): Message type
  ecpriPayload (2 bytes): Payload size in bytes
  ecpriRtcid/ecpriPcid (2 bytes): x, y, z may be constructed through a management plane (M-plane). The corresponding field may indicate a transmission path (extended antenna-carrier (eAxC) in eCPRI) of a control message of various embodiments during multi-layer transmission.
  CU_Port_ID (x bits): Classifying channel card. Possible to distinguish including up to modem (2 bits for channel card, and 2 bits for modem)
  BandSector_ID (y bits): Classifying according to cell/sector
  CC_ID (z bits): Classifying according to component carrier
  RU_Port_ID (w bits): Classifying according to layer, T, antenna, etc.
  ecpriSeqid (2 bytes): Sequence ID is managed for each ecpriRtcid/ecpriPcid, and sequence ID and subsequence ID are separately managed. When subsequence ID is used, radio-transport-level fragmentation is possible (different from application-level fragmentation)

An application protocol of fronthaul may include a control plane (C-plane), a user plane (U-plane), a synchronization plane (S-plane), and a management plane (M-plane).

The control plane may be constructed to provide scheduling information and beamforming information through a control message. The user plane may include user downlink data (IQ data or SSB/RS), uplink data (IQ data or SRS/RS), or PRACH data. A weight vector of the beamforming information described above may be multiplied by the user data. The synchronization plane may be related to timing and synchronization. The management plane may be related to initial setup, non-realtime reset or reset, and non-realtime report.

To define the type of a message transmitted on the control plane, Section Type is defined. Section Type may indicate the purpose of a control message transmitted on the control plane. For example, the purpose of each Section Type is given as follows.

sectionType=0: DL idle/guard periods—the purpose of Tx blanking for power saving
  sectionType=1: mapping BF index or weight (O-RAN mandatory BF scheme) to RE of DL/UL channel sectionType=2: reserved
  sectionType=3: mapping beamforming index or weight to PRACH and RE of mixed-numerology channel
  sectionType=4: reserved
  sectionType=5: delivering UE scheduling information wherein RU may determine realtime BF weight (O-RAN optional BF scheme)
  sectionType=6: periodically delivering UE channel information wherein RU may determine realtime BF weight (O-RAN optional BF scheme)
  sectionType=7: used for LAA support The DU may be configured to support one or more cells. Therefore, in order to support more cells, the DU may be required to save resources per cell. Resource saving per cell affects resource saving of the entire DU. IQ data is managed on the user plane (hereinafter, a U-plane). The DU may be configured to manage and store uplink data of the user plane. In a CAT-B massive multiple input multiple output (MIMO) cell, SRS transmission may be used. At this time, data related to SRS transmission may be managed and stored in the user plane. The DU may require a buffer resource for storing an SRS in addition to a buffer for storing the U-plane IQ data. Hereinafter, in the present disclosure, a way for saving resources related to an SRS buffer on fronthaul is proposed.

Figure 5:
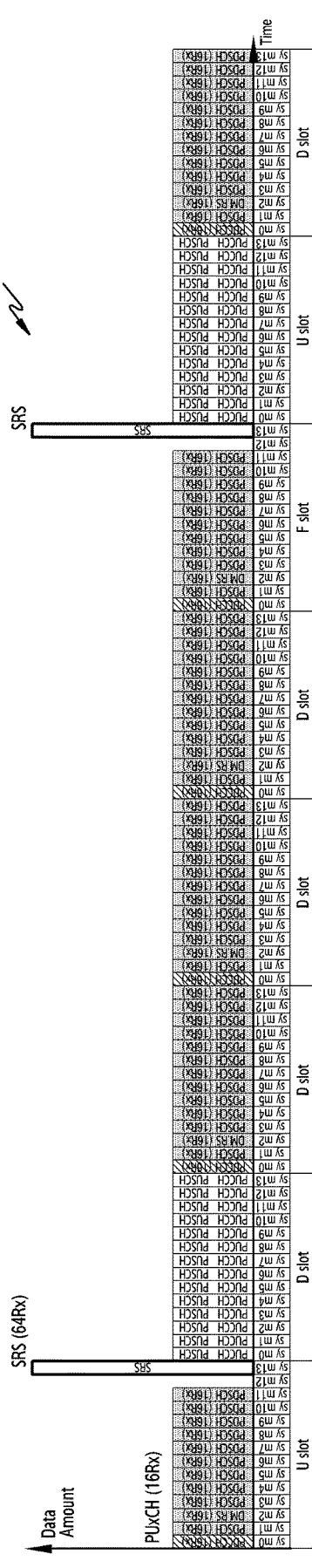
FIG. 5 illustrates an example of transmission of a sounding reference signal (SRS) according to an embodiment of the present disclosure.

FIG. 5 illustrates an example of transmission of a sounding reference signal (SRS) according to an embodiment of the present disclosure. Most U-Plane data must meet delay constraints, but there may be a specific type of U-Plane traffic to which a transmission/reception window is difficult to be applied. By not applying transmission/reception window constraints to this data, data transmission over a fronthaul interface may be spread out, reducing a maximum bandwidth required for the interface. In order to reduce a fronthaul bandwidth between the DU and the RU in the O-RAN standard, the SRS may be transmitted and received without the transmission window as non-delay-managed traffic. For details on the non-delay-managed traffic, Section 2.3.6 of the CUS spec may be referred to.

Referring to FIG. 5, the RU may receive the SRS on a wireless channel 500. A terminal may transmit the SRS. For example, in an NR time division duplex (TDD) configuration 4:1 situation, the terminal may transmit the SRS on a flexible slot (F slot) (or may be referred to as a special slot). The RU may receive the SRS from the terminal in the F slot. The RU may transmit data about the SRS received from the terminal, to the DU. The SRS transmission may be performed periodically. In order for the DU to receive the SRS transmitted as the non-delay-managed traffic without additional conditions, a buffer resource equal to an amount of all SRS data acquired within an SRS transmission duration is required. Meanwhile, data for PUSCH transmission or PUCCH (hereinafter, PUxCH) transmission is proportional to the number of uplink layers or combined receive (Rx) paths. The SRS data is proportional to the number of receive antennas for the purpose of channel estimation. That is, an amount of uplink data of PUxCH is limited according to the maximum number of layers, but the SRS data does not have this restriction. Accordingly, the SRS data traffic increases instantaneously in a symbol duration (e.g., the last symbol of the F slot) in which the SRS is transmitted. When CAT-B mMIMO supporting ORU is supported in ORAN fronthaul, an instantaneous data transmission amount of SRS is several times higher than that of PUxCH. For example, assuming an RU equipped with 64T64R and a front environment limited to the number of 16 combined receive paths, it is confirmed that SRS traffic is about 4 times more than PUxCH uplink transmission (Example of Section 2.3.6 of the O-RAN CUS standard).

To efficiently process the instantaneously increasing SRS traffic, embodiments of the present disclosure describe a way for saving a buffer resource of a DU when transmitting an SRS through fronthaul, by configuring an SRS transmission scheme. A situation in which an RU of mMIMO CAT-B transmits an SRS through fronthaul is described as an example. The SRS transmission scheme of embodiments of the present disclosure may include a scheme of transmitting SRS symbols, based on an antenna number (hereinafter, antenna number based SRS transmission), and a scheme of transmitting SRS symbols, based on completion of transmission of uplink in-phase and quadrature (IQ) data (i.e., PUxCH data) (hereinafter, uplink IQ buffer based SRS transmission). For convenience of description, each scheme is separately described, but a description of a specific embodiment does not exclude application to other embodiments. That is, at least some operations/at least some constructions between the two schemes may be mixed and used, and applying of the two schemes together may also be understood as an embodiment of the present disclosure.

Figure 7:
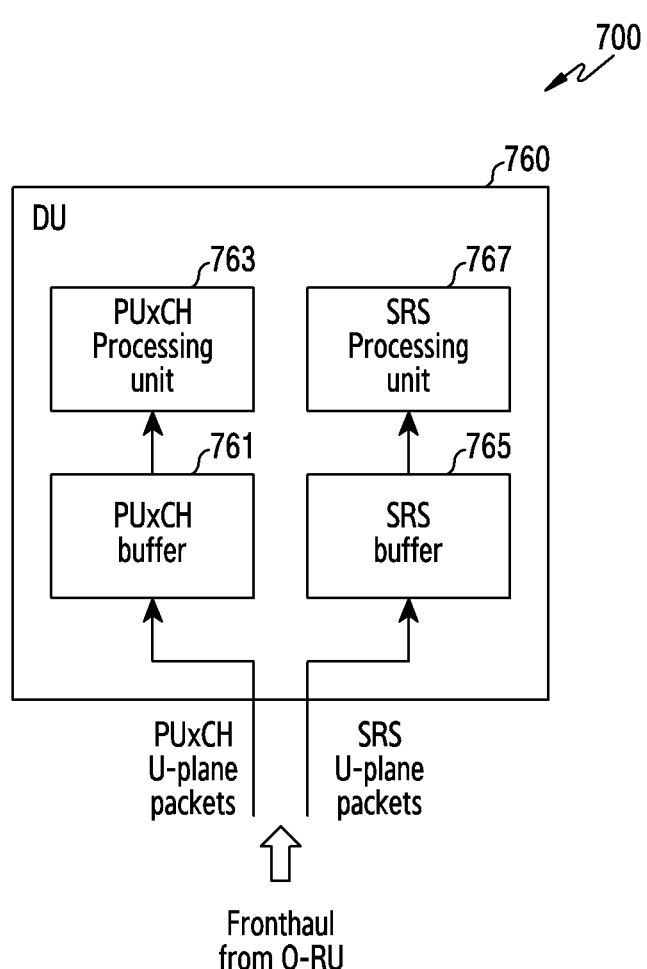
FIG. 7 illustrates an example of a functional construction of a DU for receiving antenna number based SRS transmission according to an embodiment of the present disclosure.
Figure 8:
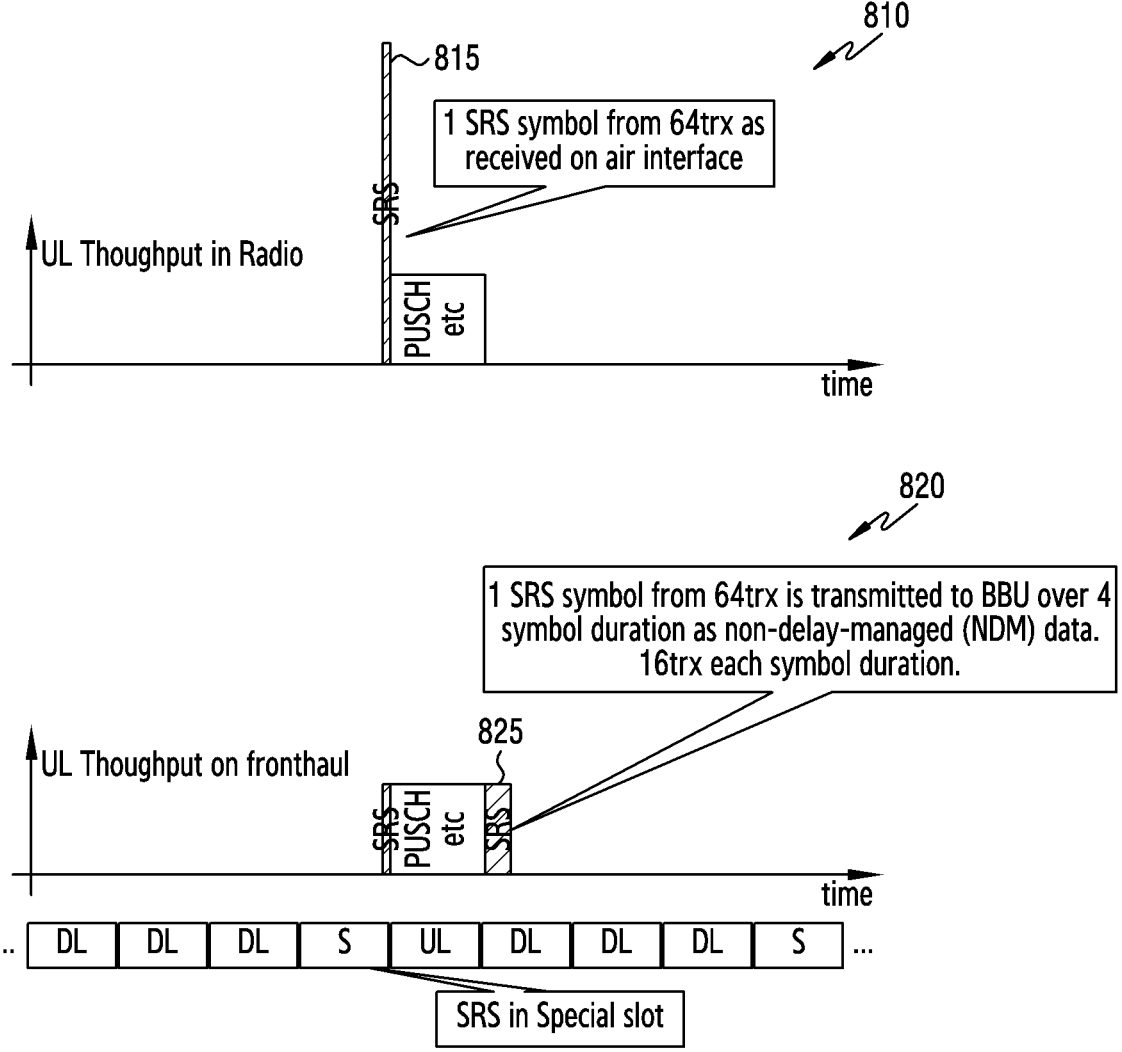
FIG. 8 illustrates an example of uplink IQ data buffer based SRS transmission according to an embodiment of the present disclosure.
Figure 9:
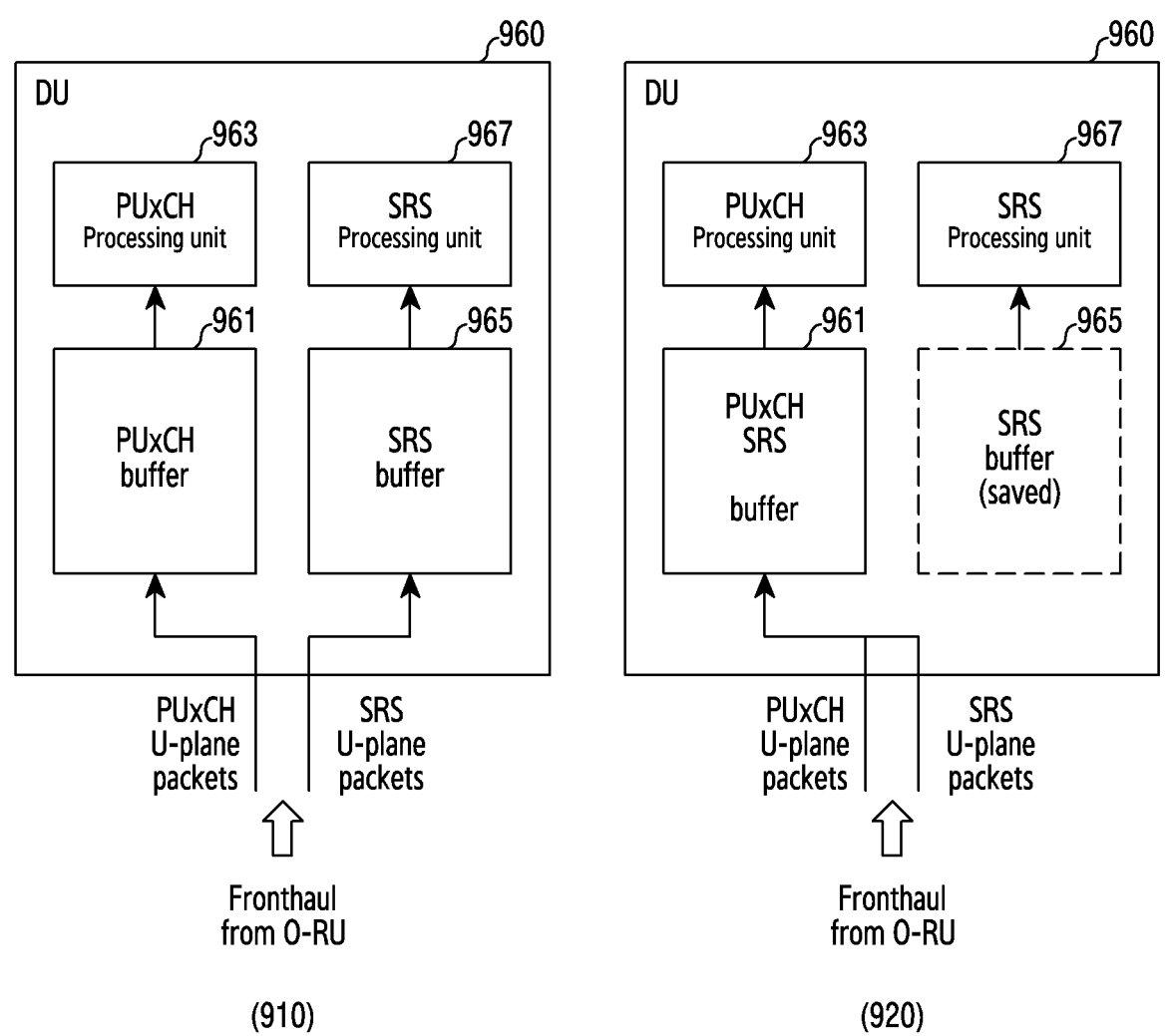
FIG. 9 illustrates an example of a functional construction of a DU for receiving uplink IQ data buffer based SRS transmission according to an embodiment of the present disclosure.

Hereinafter, a scheme of transmitting SRS symbols, based on an antenna number through FIG. 6 and FIG. 7 and a scheme of transmitting SRS symbols, based on completion of transmission of uplink IQ data through FIG. 8 and FIG. 9 are described, respectively.

Figure 6:
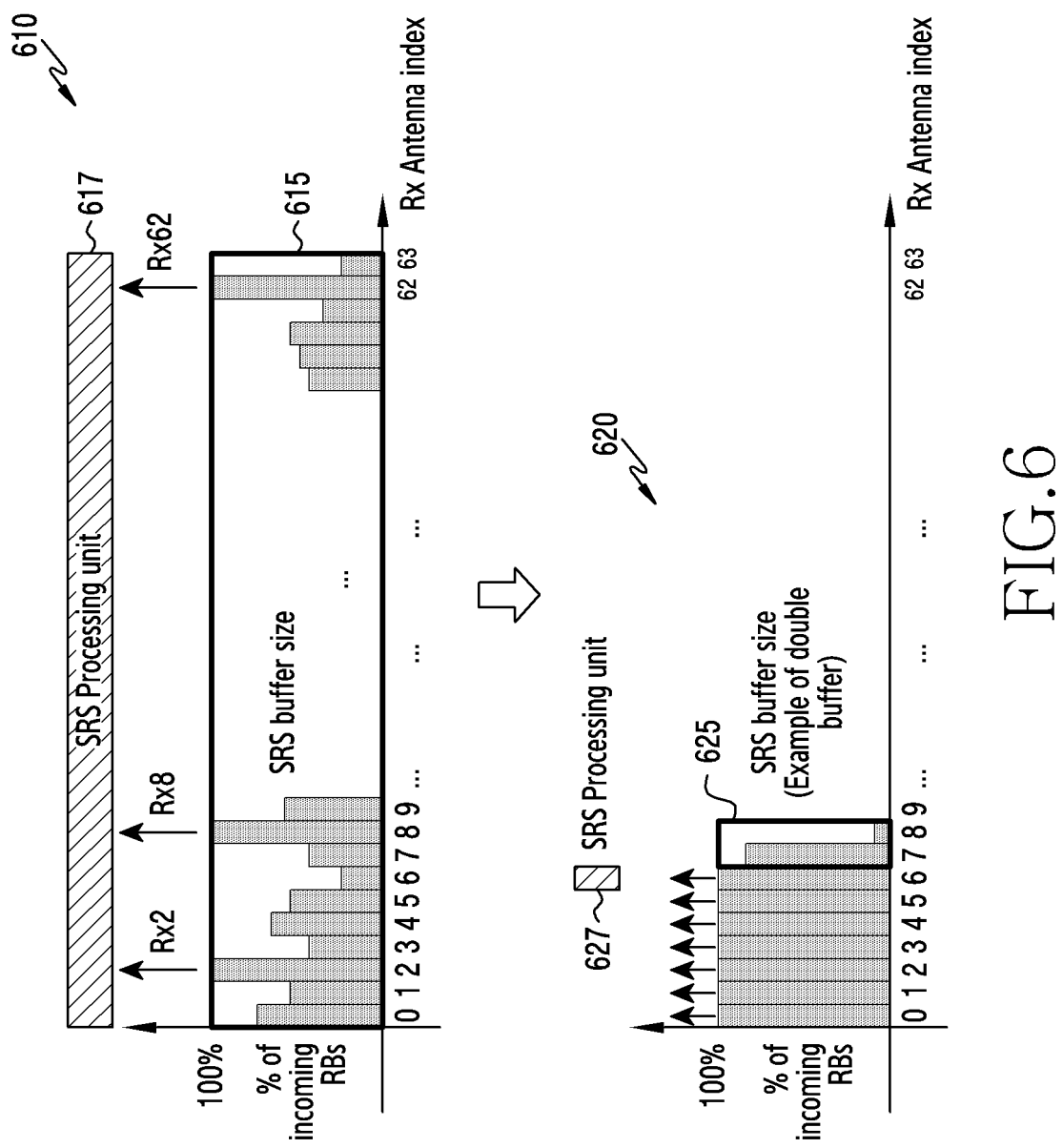
FIG. 6 illustrates an example of antenna number based SRS transmission according to an embodiment of the present disclosure.

FIG. 6 illustrates an example of antenna number based SRS transmission according to an embodiment of the present disclosure. An RU may have 64 receive antennas. The RU may acquire SRSs received in an access network. The RU may receive an SRS from a terminal. The RU may transmit SRS data to a DU through fronthaul.

Referring to FIG. 6, a first graph 610 shows an example of an SRS buffer size when an antenna number based SRS transmission scheme is not used. A horizontal axis represents a receive antenna index, and a vertical axis represents a data size. The antenna number based SRS transmission corresponds to non-delay managed U-Plane traffic in fronthaul. Therefore, the SRS transmission may be transmitted by the RU regardless of a transmission window for a symbol. Similarly, the DU may be configured not to discard non-delay managed U-Plane traffic received outside the reception window.

When SRS data, that is, SRS U-plane packets arrive without a predetermined order, the DU must store the SRS U-plane packets in a buffer, that is, perform buffering, until all SRS U-plane transmissions are completed. For example, the DU requires a buffer size 615 that is based on a specified resource (e.g., the number of corresponding RBs) and the total number (e.g., 64) of receive antennas. An SRS processing unit 617 consumes a processing resource in proportion to the buffer size 615 and takes a processing time. That is, the SRS data arriving without the predetermined order does not only require a lot of buffer resources in the DU, but also causes a delay due to an increase of the consumption of the processing resource and an increase of the processing time.

In order to solve the above problem, the antenna number based SRS transmission scheme may be used. According to embodiments of the present disclosure, the RU may transmit an SRS for each corresponding antenna to the DU, based on a specified order. The specified order may be an order determined based on the number of receive antennas. For example, the specified order may be determined in ascending order of receive antenna numbers. When it is guaranteed that the SRS U-plane packets arrive in the order of receive antenna index (e.g., eAxC ID), the required buffer size may be reduced. As the buffer size is reduced, the processing resource and the processing time may be saved. For example, the buffer size may be reduced to the size of symbols of one or two receive antennas instead of the buffer size of the number of 64 antennas.

To indicate the receive antenna number, eAxC ID may be used. An eAxC identifier of the non-delay managed U-Plane traffic may be constructed separately from an identifier of delay managed U-Plane traffic. Since the SRS data is the non-delay managed U-Plane traffic, an antenna number used in the antenna number based SRS transmission scheme, that is, RU_Port_ID may be independent of an identifier determined in uplink IQ data.

A second graph 620 shows an example of an SRS buffer size when the antenna number based SRS transmission scheme is used. The DU may receive an SRS using a buffer size 625 that is based on a specific number of receive antennas (e.g., one or two) rather than the total number of receive antennas (e.g., 64). The buffer size 625 of an SRS buffer included in the DU may depend on a specified resource (e.g., corresponding RB size) and a specified number (e.g., one or two). An SRS processing unit 627 consumes a processing resource in proportion to the buffer size 625 and takes a processing time. Therefore, in the DU, the SRS is buffered and processed with a specified number of receive antenna units (e.g., 1, 2, or below K (K=natural number less than 64)), whereby resource saving and time saving are possible.

FIG. 7 illustrates an example of a functional construction of a DU for receiving antenna number based SRS transmission according to an embodiment of the present disclosure. A description of the DU 160 of FIG. 1 and FIG. 2 may be applied to a DU 760 in the same or similar manner.

Referring to FIG. 7, the DU 760 may include a PUxCH buffer 761, a PUxCH processing unit 763, an SRS buffer 765, and an SRS processing unit 767. The DU 760 may receive uplink IQ data from an RU through fronthaul. The uplink IQ data may include PUxCH U-plane packets. For example, the uplink IQ data may include control channel data (e.g., PUCCH data). Also, for example, the uplink IQ data may include user data (e.g., PUSCH data). The DU 760 may store the uplink IQ data in the PUxCH buffer 761 and then process the uplink IQ data through the PUxCH processing unit 763.

The DU 760 may receive SRS data from an RU through fronthaul. The SRS data may include SRS U-plane packets. The DU 760 may store the SRS data in the SRS buffer 765 and then process the SRS data through the SRS processing unit 767. According to embodiments of the present disclosure, the RU may transmit an SRS in accordance with the antenna number based SRS transmission scheme. As described through FIG. 6, the RU may transmit the SRS, based on a specified order of antenna numbers. The transmission of the specified order may be shared by the DU 760. Since the DU 760 knows that the SRS will be delivered to the DU 760 through the fronthaul in a specified order, there is no need to configure a buffer size equal to the total number of receive antennas. An SRS buffer size may be determined based on a specified antenna unit (being configured smaller than the total number of receive antennas). The DU 760 may configure an SRS buffer of the SRS buffer size.

In FIG. 6 and FIG. 7, the receive antenna number based SRS transmission scheme has been described. The specified order may be shared between a DU and an RU. That is, in the receive antenna number based SRS transmission scheme, the DU may assume that the RU transmits SRS data through fronthaul in a specified order. Meanwhile, as an example of the specified order, an example of a situation in which Rx antenna ports are sequentially transmitted has been described, but embodiments of the present disclosure are not limited thereto. When the order defined in the standard is shared between the DU and the RU, the order does not necessarily need to be defined in ascending order of port numbers. Even if SRS transmission is performed according to order determined in another scheme, since the DU sequentially receives SRS data by the unit of specific antenna, the SRS buffer size may be reduced in proportion to the corresponding unit of specific antenna. The order determined in another scheme (or may be referred to as a specified pattern) may be shared between the DU and the RU.

As an additional embodiment, the order of a group unit may be defined too. The entire receive antennas may be divided into antenna groups, and the order of the groups may be defined. For example, when 64 receive antennas are used for SRS reception in the RU, the SRS buffer size may be composed of 4 receive antennas and a unit resource amount (e.g., RB). At this time, the order of 16 groups may be predefined or be configured in the RU by the DU.

FIG. 8 illustrates an example of uplink IQ data buffer based SRS transmission according to an embodiment of the present disclosure. The uplink IQ buffer based SRS transmission means a scheme of transmitting an SRS where a DU may receive SRS data through an uplink IQ buffer. After transmitting a PUxCH U-plane packet, an RU may divide and send an SRS by a peak of PUxCH. At this time, the DU may use a PUxCH buffer so as to store the SRS data without separately configuring a buffer for storing SRS. In this embodiment, a TDD system is assumed.

Referring to FIG. 8, a first graph 810 illustrates a relationship between an uplink (UL) throughput and a time in a wireless channel. SRS 815 indicates traffic corresponding to SRS symbols in a wireless channel. As mentioned in FIG. 5, since the SRS is received through all antennas for channel estimation, a SRS traffic of the RU instantaneously increases in a 64T64R system (hereinafter, 64TRX). This is because SRSs for all antenna ports are transmitted in a specific symbol (e.g., the last symbol of a special slot). Because a large amount of SRS data is received during a special slot of the air interface, a required peak fronthaul bandwidth requirement may be reduced by allowing SRS data to be transmitted to an O-DU outside a normal transmission window of an O-RU and instead allowing the SRS data to use an unused fronthaul interface bandwidth.

A second graph 820 illustrates a relationship between a UL throughput and a time in fronthaul. An SRS 825 indicates traffic corresponding to SRS symbols in the fronthaul. By transmitting traffic corresponding to a plurality of SRS symbols over four symbol duration as non-delayed-managed (NDM) data in a wireless channel, substantially traffic for 16 antennas per symbol duration (e.g., 16 SRS symbols) may be delivered to the DU. At this time, part of the SRS data is delivered to the DU in a special slot region, but another part of the SRS data may be delivered to the DU at DL transmission after UL transmission. This is because DL traffic and UL traffic are temporally differentiated in the TDD system. Since there is no UL traffic in a DL slot, a space of the PUxCH buffer in the DU may be free. Therefore, the DU may use the PUxCH buffer so as to store part of the SRS data. Accordingly, a resource of the SRS buffer may be saved.

For the above-mentioned advantages, the DU of embodiments of the present disclosure may be configured where the RU performs the uplink IQ data buffer based SRS transmission. The DU needs to know in advance that SRS data will be transmitted in a DL transmission duration after the RU transmits uplink IQ data such as PUSCH or PUCCH. This is to prevent configuring an unnecessary SRS buffer resource. Accordingly, the DU may transmit a configuration message for uplink IQ data buffer based SRS transmission to the RU. According to an embodiment, the message may be transmitted on a management-plane (M-plane). The RU may be configured to transmit SRS data after a UL symbol, according to the configuration message. The uplink IQ data buffer based SRS transmission may be referred to as another term having the same technical meaning, such as TDD-UL symbol post SRS transmission or TDD-DL symbol based SRS transmission. After transmission of the U-plane packet for PUxCH, the RU transmits an SRS U-plane packet with the same maximum size, whereby a separate SRS buffer resource of the DU may be saved.

In FIG. 8, an operation of transmitting SRS data with a limited size (maximum size of a U-plane packet for PUxCH) in a special slot is shown. The uplink IQ data buffer based SRS transmission may include an operation of transmitting SRS data with a limited size (maximum size of a U-plane packet for PUxCH) in a special slot, but in some other embodiments, it may mean that the uplink IQ data buffer based SRS transmission includes only an operation of transmitting SRS data transmitted with a limited size (maximum size of a U-plane packet for PUxCH) after a UL symbol.

FIG. 9 illustrates an example of a functional construction of a DU for receiving uplink IQ data buffer based SRS transmission according to an embodiment of the present disclosure. The description of the DU 160 of FIG. 1 and FIG. 2 or the DU 760 of FIG. 7 may be applied to a DU 960 in the same or similar manner.

Referring to FIG. 9, the DU 960 may include a PUxCH buffer 961, a PUxCH processing unit 963, an SRS buffer 965, and an SRS processing unit 967. The DU 960 may receive uplink IQ data from an RU through fronthaul. The uplink IQ data may include PUxCH U-plane packets. The DU 960 may store the uplink IQ data in the PUxCH buffer 961 and then process the uplink IQ data through the PUxCH processing unit 963. The DU 960 may receive SRS data from the RU through the fronthaul. The SRS data may include SRS U-plane packets. The DU 960 may store the SRS data in the SRS buffer 965 and then process the SRS data through the SRS processing unit 967. According to an embodiment, the RU may configure the SRS buffer 965 so as to process the SRS data (910).

According to an embodiment, when the uplink IQ data buffer based SRS transmission is configured, the RU may be configured to transmit SRS data in a DL duration after a UL duration ends in a TDD system. The RU may recognize that, when the SRS data is transmitted in the DL duration, the uplink IQ data buffer, that is, the PUxCH buffer 961 will be used in the DU 960. When the uplink IQ data buffer based SRS transmission is configured, the DU 960 may store the SRS data through the PUxCH buffer 961. This is because there is no UL traffic in a DL slot in the TDD system. A resource of the separate SRS buffer 965 may be saved, by transmitting the SRS on the SRS U-plane with the same maximum size after transmitting the SRS on the PUxCH U-plane. According to an embodiment, the RU may configure the PUxCH buffer 961 so as to process the SRS data (920).

Through FIG. 6 to FIG. 9, a method for saving the SRS buffer has been described. The above schemes require that the DU know in advance a transmission scheme of the RU. That is, the DU may operate not to configure an SRS buffer of a size (e.g., a size reduced by a specified antenna unit instead of the total number of antennas) to be configured according to an SRS transmission scheme of the RU, or an SRS buffer. In order to control the operations of the above-described DU and RU, there is a need to define a management configuring (e.g., ORAN M-plane).

The RU of various embodiments may transmit capability information of the RU to the DU. The capability information may be transmitted through fronthaul. The DU may receive the capability information of the RU. The capability information of the RU may include information indicating an SRS transmission scheme supported by the RU. According to an embodiment, the capability information of the RU may include information indicating whether the RU supports the antenna number based SRS transmission scheme. Also, according to an embodiment, the capability information of the RU may include information indicating whether the RU is possible to support the uplink IQ data buffer based SRS transmission scheme when the TDD system is configured.

The DU of various embodiments may transmit a configuration message to the RU. The configuration message may be transmitted through fronthaul. The RU may receive the configuration message of the DU. According to an embodiment, the configuration message may be determined based on capability information of the RU. The configuration message may include information indicating an SRS transmission scheme to be performed in the RU. According to an embodiment, the configuration message may include information for configuring the RU where the RU transmits SRS data to the DU according to the antenna number based SRS transmission scheme. According to the configuration message, the RU may be configured to transmit SRS data in a specified order (e.g., antenna number order). In this case, according to an additional embodiment, when the specified order is not predefined, the configuration message may further include information about the specified order. When the specified order is not configured, SRS transmission may be performed based on ascending order of antenna numbers.

Also, according to an embodiment, the configuration message may include information for configuring the RU where the RU transmits SRS data to the DU according to am uplink IQ data buffer based SRS transmission scheme. According to the configuration message, the RU may be configured to transmit SRS data in a DL transmission duration (e.g., DL slot, DL symbol) after a UL transmission duration (e.g., UL slot, UL symbol) has elapsed in the TDD system. At this time, according to an additional embodiment, the configuration message may further include information about a duration in which SRS data is to be transmitted, that is, a duration in which PUSCH is not used. In other words, the configuration message may specify a duration for transmitting SRS data within a DL duration, and further include information about a specified region. Here, the specified region may be determined according to TDD configuration. When the specified region is not constructed, the RU may be configured to transmit SRS data to the DU in a next duration (e.g., symbol or slot) after a UL transmission duration ends. Meanwhile, according to an additional embodiment, the RU may be also configured to transmit an SRS with a limited size (maximum size of a U-plane packet for PUxCH) in a symbol of an F slot in which the SRS is transmitted.

According to an embodiment, a parameter for a corresponding operation may be added to the M-plane Yang model (e.g., D.2.8 o-ran-uplane-conf.yang Module). For example, parameters may be configured as shown in Table 1 below.

TABLE 1

```
module: o-ran-uplane-conf
+--rw user-plane-configuration
+--rw low-level-tx-links* [name]
...
+--ro static-low-level-rx-endpoints* [name]
| +--ro name string
...
| +--ro static-config-supported?               enumeration
| +--ro max-prach-patterns?                     uint8
| +--ro max-srs-patterns?                       uint8
| +--ro configurable-tdd-pattern-supported? boolean {mcap:CONFIGURABLE-
TDD-PATTERN-SUPPORTED}?
   | +--ro tdd-group?                           uint8
   | +--ro srs-transmission-antenna-number-order? boolean {mcap:SRS-
TRANSMISSION-ANTENNA-NUMBER-ORDER}?
   | +--ro srs-transmission-after-ul-symbols-tdd? boolean {mcap:SRS-
TRANSMISSION-AFTER-UL-SYMBOLS-TDD}?
   ...
   +--rw low-level-rx-endpoints* [name] | +--rw name -> /user-plane-
configuration/static-low-level-rx-endpoints/name
   | +--rw compression
   | +--rw static-config-supported? -> /user-plane-configuration/static-low-level-rx-
endpoints[name=current( )/../name]/static-config-supported
   | +--rw static-prach-configuration? -> /user-plane-configuration/static-prach-
configurations/static-prach-config-id
   | +--rw static-srs-configuration? -> /user-plane-configuration/static-srs-
configurations/static-srs-config-id
   | +--rw configurable-tdd-pattern-supported? -> /user-plane-configuration/static-low-
level-rx-endpoints[name=current( )/../name]/configurable-tdd-pattern-supported
   | +--rw srs-transmission-antenna-number-order? -> /user-plane-
configuration/static-low-level-rx-endpoints[name=current( )/../name]/srs-transmission-
antenna-number-order
   | +--rw srs-transmission-after-ul-symbols-tdd? -> /user-plane-
configuration/static-low-level-rx-endpoints[name=current( )/../name]/srs-transmission-
after-ul-symbols-tdd
   ...
```

Figure 10:
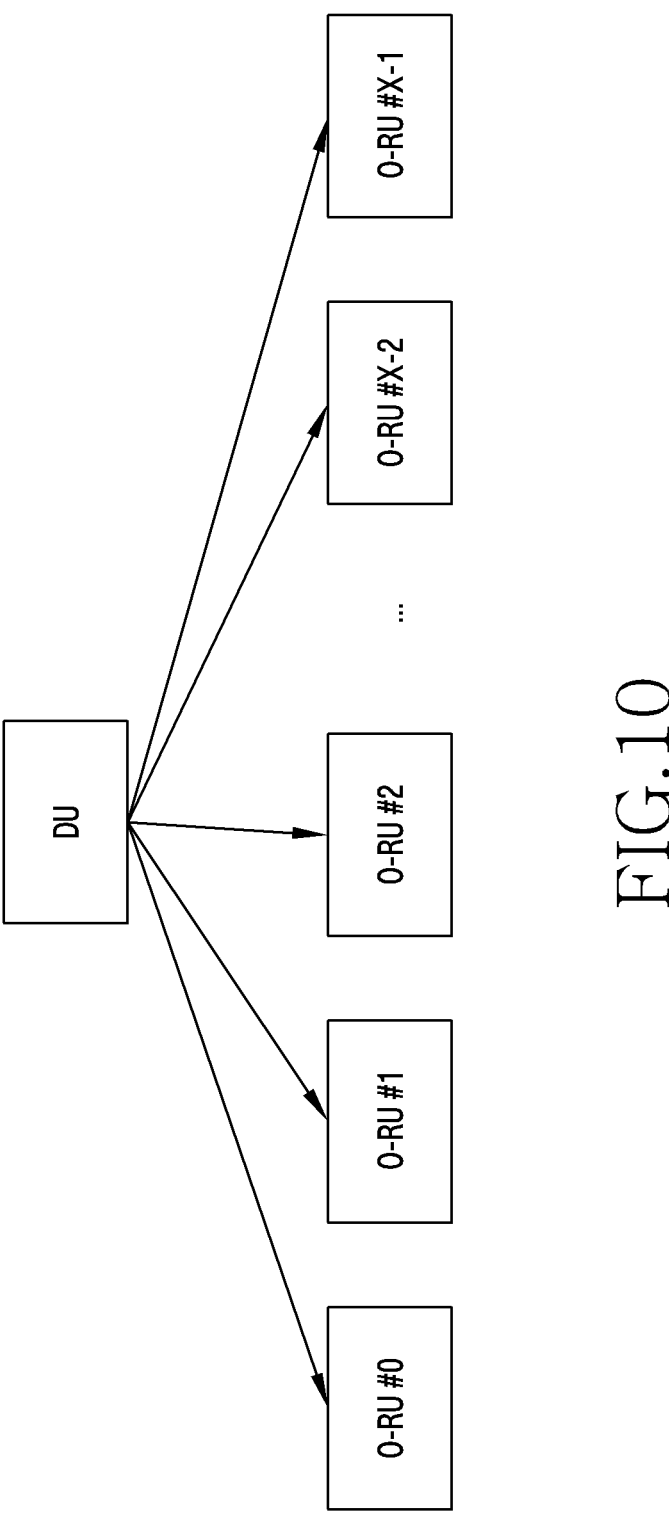
FIG. 10 illustrates an example of connection between a DU and RUs according to an embodiment of the present disclosure.

FIG. 10 illustrates an example of connection between a DU and RUs according to an embodiment of the present disclosure. An SRS transmission scheme of embodiments of the present disclosure is an SRS transmission scheme in an RU, defined to reduce an existing SRS buffer size. Since the SRS transmission scheme is defined between the DU and the RU, the DU may assume that the RU performs SRS transmission through a specific SRS transmission scheme. The DU may be connected with one or more RUs. Accordingly, the SRS transmission scheme may be determined in various schemes according to an RU and DU promise.

Referring to FIG. 10, the DU may be connected to the multiple RUs. In this case, since the RU complies with the O-RAN standard, it may be referred to as an O-RU. The DU may be connected with X number of O-RUs. The DU may be connected to O-RU #0, O-RU #1, O-RU #2, . . . . , O-RU #X-1. According to an embodiment, some of the O-RUs may periodically transmit SRS data to the DU through an antenna number based SRS transmission scheme. Also, according to an embodiment, some of the O-RUs may periodically transmit SRS data to the DU through an uplink IQ data based SRS transmission scheme. Also, in some embodiments, some O-RUs may use the antenna number based SRS transmission scheme and the uplink IQ data based SRS transmission scheme. The SRS transmission scheme of each RU may be configured by the DU. The DU may configure this to each RU through parameters of a management plane.

A device and method of various embodiments of the present disclosure may efficiently operate an interface between a digital unit (DU) and a radio unit (RU) through transmission control of a sounding reference signal (SRS) on fronthaul.

Effects obtainable in the present disclosure are not limited to the effects mentioned above, and other effects not mentioned above will be clearly understood by those having a general knowledge in the art to which the present disclosure belongs from the description.

According to various embodiments of the present disclosure, a method of operating a digital unit (DU) of a base station in a wireless communication system may include the processes of transmitting a configuration message for an SRS transmission scheme to a radio unit (RU) through a fronthaul interface, configuring a buffer, based on the SRS transmission scheme, and acquiring sounding reference signal (SRS) data for multiple antennas of the RU through the fronthaul interface, based on the buffer.

According to an embodiment, the configuration message may be delivered on a management plane, and the configuration message may include information for configuring the RU to transmit the SRS data according to a specified order for the multiple antennas.

According to an embodiment, the specified order may be defined in an ascending order of antenna numbers of the multiple antennas.

According to an embodiment, the buffer may be an SRS only buffer, and a size of the SRS only buffer may be configured based on the number of unit antennas.

According to an embodiment, the specified order may be configured by the unit of antenna group, and the number of unit antennas may correspond to the number of antennas in the antenna group, and SRS data for antennas in the antenna group may be transmitted in an arbitrary order.

According to an embodiment, the configuration message may be delivered on a management plane, and the configuration message may include information for configuring the RU to transmit the SRS data after a transmission duration of uplink IQ data.

According to an embodiment, the SRS data may be received in a downlink transmission duration in a time division duplex (TDD) system.

According to an embodiment, the buffer may be a buffer for the uplink IQ data, and the SRS data may be constructed to be time-divided and transmitted wherein a transmission amount per unit time does not exceed the maximum size of the uplink IQ data.

According to various embodiments of the present disclosure, a method of operating a radio unit (RU) of a base station in a wireless communication system may include the processes of receiving a configuration message for an SRS transmission scheme from a digital unit (DU) through a fronthaul interface, and transmitting sounding reference signal (SRS) data for multiple antennas to the DU through a fronthaul interface, based on the SRS transmission scheme, and the SRS transmission scheme may be related to the configuring of a buffer used to acquire the SRS data in the DU.

According to an embodiment, the configuration message may be delivered on a management plane, and the configuration message may include information for configuring the RU to transmit the SRS data according to a specified order for the multiple antennas.

According to an embodiment, the specified order may be defined in an ascending order of antenna numbers of the multiple antennas.

According to an embodiment, the buffer may be an SRS only buffer, and a size of the SRS only buffer may be configured based on the number of unit antennas.

According to an embodiment, the specified order may be configured by the unit of antenna group, and the number of unit antennas may correspond to the number of antennas in the antenna group, and SRS data for antennas in the antenna group may be transmitted in an arbitrary order.

According to an embodiment, the configuration message may be delivered on a management plane, and the configuration message may include information for configuring the RU to transmit the SRS data after a transmission duration of uplink IQ data.

According to an embodiment, the SRS data may be transmitted in a downlink transmission duration in a time division duplex (TDD) system.

According to an embodiment, the buffer may be a buffer for the uplink IQ data, and the SRS data may be constructed to be time-divided and transmitted wherein a transmission amount per unit time does not exceed the maximum size of the uplink IQ data.

According to various embodiments of the present disclosure, a device of a digital unit (DU) of a base station in a wireless communication system may include at least one transceiver and at least one processor. The at least one processor may be configured to transmit a configuration message for an SRS transmission scheme to a radio unit (RU) through a fronthaul interface, configure a buffer, based on the SRS transmission scheme, and acquire sounding reference signal (SRS) data for multiple antennas of the RU through the fronthaul interface, based on the buffer.

According to an embodiment, the configuration message may be delivered on a management plane, and the configuration message may include information for configuring the RU to transmit the SRS data according to a specified order for the multiple antennas.

According to an embodiment, the specified order may be defined in an ascending order of antenna numbers of the multiple antennas.

According to an embodiment, the buffer may be an SRS only buffer, and a size of the SRS only buffer may be configured based on the number of unit antennas.

According to an embodiment, the specified order may be configured by the unit of antenna group, and the number of unit antennas may correspond to the number of antennas in the antenna group, and SRS data for antennas in the antenna group may be transmitted in an arbitrary order.

According to an embodiment, the configuration message may be delivered on a management plane, and the configuration message may include information for configuring the RU to transmit the SRS data after a transmission duration of uplink IQ data.

According to an embodiment, the SRS data may be received in a downlink transmission duration in a time division duplex (TDD) system.

According to an embodiment, the buffer may be a buffer for the uplink IQ data, and the SRS data may be constructed to be time-divided and transmitted wherein a transmission amount per unit time does not exceed the maximum size of the uplink IQ data.

According to various embodiments of the present disclosure, a device of a radio unit (RU) of a base station in a wireless communication system may include at least one transceiver and at least one processor. The at least one processor may be configured to receive a configuration message for an SRS transmission scheme from a digital unit (DU) through a fronthaul interface, and transmit sounding reference signal (SRS) data for multiple antennas to the DU through the fronthaul interface, based on the SRS transmission scheme. The SRS transmission scheme may be related to the configuring of a buffer used to acquire the SRS data in the DU.

According to an embodiment, the configuration message may be delivered on a management plane, and the configuration message may include information for configuring the RU to transmit the SRS data according to a specified order for the multiple antennas.

According to an embodiment, the specified order may be defined in an ascending order of antenna numbers of the multiple antennas.

According to an embodiment, the buffer may be an SRS only buffer, and a size of the SRS only buffer may be configured based on the number of unit antennas.

According to an embodiment, the specified order may be configured by the unit of antenna group, and the number of unit antennas may correspond to the number of antennas in the antenna group, and SRS data for antennas in the antenna group may be transmitted in an arbitrary order.

According to an embodiment, the configuration message may be delivered on a management plane, and the configuration message may include information for configuring the RU to transmit the SRS data after a transmission duration of uplink IQ data.

According to an embodiment, the SRS data may be transmitted in a downlink transmission duration in a time division duplex (TDD) system.

According to an embodiment, the buffer may be a buffer for the uplink IQ data, and the SRS data may be constructed to be time-divided and transmitted wherein a transmission amount per unit time does not exceed the maximum size of the uplink IQ data.

In general, in massive MIMO (mMIMO), an instantaneous data amount of an SRS symbol (i.e., an SRS data amount) is several times larger than an instantaneous data amount of a UL data symbol (i.e., a PUxCH IQ data amount). When a DU and an RU send an SRS at a rate received in a wireless channel, i.e., air, several times more bandwidth (BW) than other UL data is required. Because of this, the installation and maintenance cost of a fronthaul line (FH line) may increase. To reduce the installation and maintenance cost, the SRS needs to be constructed to be transmitted at a time point at which UL data transmission is not performed, when being transmitted through fronthaul. The SRS is transmitted in a non-delay-managed-traffic form without a transmission window condition to start and complete transmission in a specific time point duration. At this time, a transmission order within an SRS symbol duration is not defined. To this end, the DU must configure a buffer resource for receiving an SRS that is not known when to be transmitted separately from a UL data buffer. Also, when there is no transmission order of an SRS symbol, a buffer resource of a data amount size of all SRS symbols must be prepared. Since an instantaneous capacity of the SRS is large, when the SRS is not known to arrive when and in what order, a DU side must secure a large buffer and processing resource for the purpose of SRS reception. To reduce this, various methods have been described in the present disclosure. According to an embodiment, when it is guaranteed to transmit SRS symbols coming from a plurality of receive antennas to fronthaul in the order of receive antenna numbers, the DU may perform SRS data processing with only a buffer resource equivalent to at least one or two receive antennas. Also, according to an embodiment, in the TDD system, when the RU transmits the SRS through the fronthaul, the RU may be configured to transmit SRS data not to exceed a UL data max rate immediately after continuous transmission of uplink data (e.g., PUSCH or PUCCH) is completed. At this time, the DU does not require a separate SRS buffer, and may use a UL data buffer in common in time division. Accordingly, there is an effect of not only saving an SRS buffering resource and processing resource in the DU, but also reducing an SRS processing time. In embodiments of the present disclosure, when the RU transmits the SRS through the fronthaul, constraints are promised between the DU and the RU in advance (e.g., capability information, configuration message, etc.), thereby making efficient an SRS buffer, a processing resource, and a processing time for processing DU-side SRS data.

Methods of embodiments described in the claims or specification of the present disclosure may be implemented in the form of hardware, software, or a combination of hardware and software.

When it is implemented by software, a computer readable storage medium storing one or more programs (software modules) may be presented. One or more programs stored in a computer-readable storage medium are configured for execution by one or more processors in an electronic device. The one or more programs include instructions that cause the electronic device to execute methods of embodiments described in the claims or specification of the present disclosure. The computer-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

Such programs (software modules, software) may be stored in a random access memory, a non-volatile memory including a flash memory, a read only memory (ROM), an electrically erasable programmable ROM (EEPROM), a magnetic disc storage device, a compact disc-ROM (CD-ROM), digital versatile discs (DVDs) or other optical storage devices, magnetic cassettes. Or, it may be stored in a memory composed of a combination of some or all of these. Also, each configuration memory may be included in multiple numbers.

Also, the program may be stored in an attachable storage device that may be accessed through a communication network such as the Internet, an intranet, a local area network (LAN), a wide area network (WAN), or a storage area network (SAN), or a communication network consisting of a combination thereof. Such a storage device may be connected to a device performing an embodiment of the present disclosure through an external port. Also, a separate storage device on a communication network may be connected to a device performing an embodiment of the present disclosure.

In the specific embodiments of the present disclosure described above, components included in the disclosure are expressed in singular or plural number according to the specific embodiments presented. However, the expression of the singular or plural number is selected appropriately for the presented situation for convenience of description, and the present disclosure is not limited to singular or plural components, and even the component expressed in the plural numbers are composed of the singular number, or even the component expressed in the singular number may be composed of the plural number.

Meanwhile, in the detailed description of the present disclosure, specific embodiments have been described, but various modifications are possible without departing from the scope of the present disclosure. Therefore, the scope of the present disclosure should not be limited to and defined by the described embodiments and should be defined by the scope of the claims described below as well as equivalents to the scope of these claims.

What is claimed is:

1. A method performed by a digital unit (DU) in a wireless communication system, the method comprising:
   transmitting, to a radio unit (RU), a configuration message on a management plane; and
   receiving, from the RU, a plurality of user plane messages for an uplink transmission, based on the configuration message,
   wherein the configuration message is used to configure a transmission order of the plurality of user plane messages, and
   wherein the transmission order of the plurality of user plane messages corresponds to an order of a plurality of extended antenna-carriers (eAxCs).

2. The method of claim 1, wherein the plurality of eAxCs correspond to a plurality of antennas of the RU, and
   wherein the transmission order is determined by an ascending order of the plurality of eAxCs.

3. The method of claim 1, wherein information on a group order in the management plane and information on the order of eAxCs in a group are configured in the RU.

4. The method of claim 1, wherein the configuration message is associated with information indicating whether the configuration of the transmission order is supported.

5. A method performed by a radio unit (RU) in a wireless communication system, the method comprising:
   receiving a configuration message from a digital unit (DU) on a management plane; and
   transmitting, to the DU, a plurality of user plane messages for an uplink transmission, based on the configuration message, wherein the configuration message is used to configure a transmission order of the plurality of user plane messages, and
   wherein the transmission order of the plurality of user plane messages corresponds to an order of a plurality of extended antenna-carriers (eAxCs).

6. The method of claim 5, wherein the plurality of eAxCs correspond to a plurality of antennas of the RU, and
   wherein the transmission order is determined by an ascending order of the plurality of eAxCs.

7. The method of claim 5, wherein information on a group order in the management plane and information on the order of eAxCs in a group are configured in the RU.

8. The method of claim 5, wherein the configuration message is associated with information indicating whether the configuration of the transmission order is supported.

9. A digital unit (DU) in a wireless communication system, the DU comprising:
   at least one transceiver; and
   a controller coupled to the at least one transceiver and configured to:
   transmit, to a radio unit (RU), a configuration message on a management plane; and
   receive, from the RU, a plurality of user plane messages for an uplink transmission, based on the configuration message,
   wherein the configuration message is used to configure a transmission order of the plurality of user plane messages, and
   wherein the transmission order of the plurality of user plane messages corresponds to an order of a plurality of extended antenna-carriers (eAxCs).

10. The DU of claim 9, wherein the plurality of eAxCs correspond to a plurality of antennas of the RU, and
   wherein the transmission order is determined by an ascending order of the plurality of eAxCs.

11. The DU of claim 9, wherein information on a group order in the management plane and information on the order of eAxCs in a group are configured in the RU.

12. The DU of claim 9, wherein the configuration message is associated with information indicating whether the configuration of the transmission order is supported.

13. A radio unit (RU) in a wireless communication system, the RU comprising:
   at least one transceiver; and
   a controller coupled to the at least one transceiver and configured to:
   receive, from a digital unit (DU), a configuration message on a management plane; and
   transmit, to the DU, a plurality of user plane messages for an uplink transmission, based on the configuration message,
   wherein the configuration message is used to configure a transmission order of the plurality of user plane messages, and
   wherein the transmission order of the plurality of user plane messages corresponds to an order of a plurality of extended antenna-carriers (eAxCs).

14. The RU of claim 13, wherein the plurality of eAxCs correspond to a plurality of antennas of the RU, and
   wherein the transmission order is determined by an ascending order of the plurality of eAxCs.

15. The RU of claim 13, wherein information on a group order in the management plane and information on the order of eAxCs in a group are configured in the RU.

16. The RU of claim 13, wherein the configuration message is associated with information indicating whether the configuration of the transmission order is supported.

* * * * *